Figure 1:
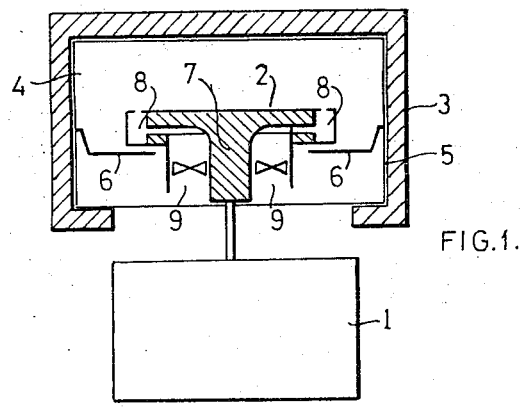

United States Patent [19]
Bliss

[11] 3,854,403
[45] Dec. 17, 1974

[54] TRACKED AIR CUSHION VEHICLES

[75] Inventor: Denys Stanley Bliss, Cambridge, England

[73] Assignee: Bliss Pendair Limited, London, England

[22] Filed: July 2, 1973

[21] Appl. No.: 375,647

[30] Foreign Application Priority Data
July 3, 1972 Great Britain .................... 30954/72

[52] U.S. Cl. ............................. 104/23 FS, 104/134
[51] Int. Cl. ............................................ B61d 15/00
[58] Field of Search .............. 104/23 FS, 23 R, 134; 180/120, 122, 125, 127, 128, 129, 115; 105/148, 149, 150

[56] References Cited
UNITED STATES PATENTS

| | | | |
|---|---|---|---|
| 3,511,186 | 5/1970 | Barthalon | 104/23 FS X |
| 3,534,689 | 10/1970 | Barthalon | 104/23 FS X |
| 3,575,115 | 4/1971 | Giraud | 104/23 FS |
| 3,580,181 | 5/1971 | Bertin et al. | 104/23 FS X |
| 3,744,429 | 7/1973 | Bertin | 104/23 FS |

Primary Examiner—Lloyd L. King
Assistant Examiner—Randolph A. Reese
Attorney, Agent, or Firm—Baldwin, Wight & Brown

[57] ABSTRACT

An air cushion vehicle including at least one air cushion for support or guidance purposes in which the cushion is defined at least in part by walls which incorporate moveable edge members. The edge members are configured so that the pressure within the cushion, which may be negative or positive, tends to move the members away from a surface, usually a prepared track, on which the cushion is sustained, thus increasing air leakage into or from the cushion and decreasing the pressure differential across the cushion wall until the force on the wall is balanced by an opposing force independently applied to the edge member and determining the magnitude of said pressure differential.

23 Claims, 35 Drawing Figures

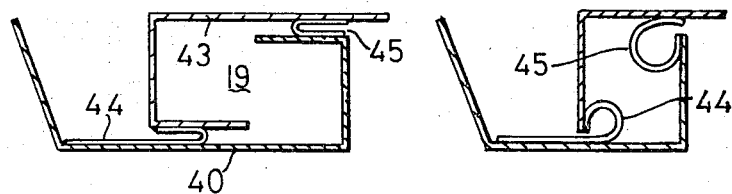
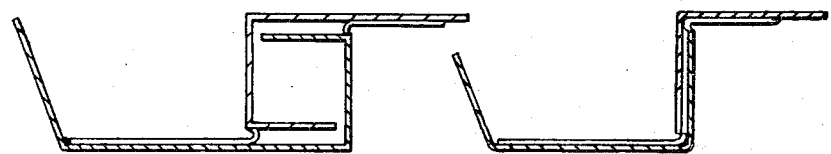
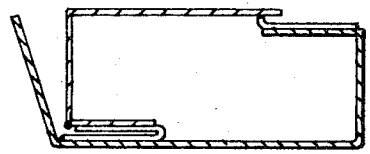 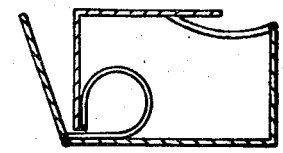
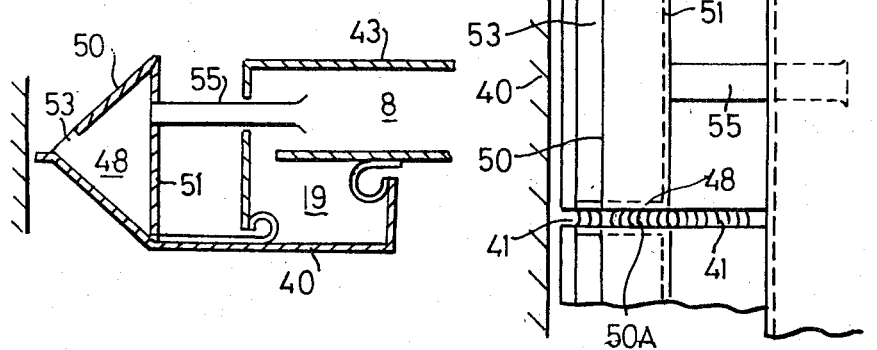

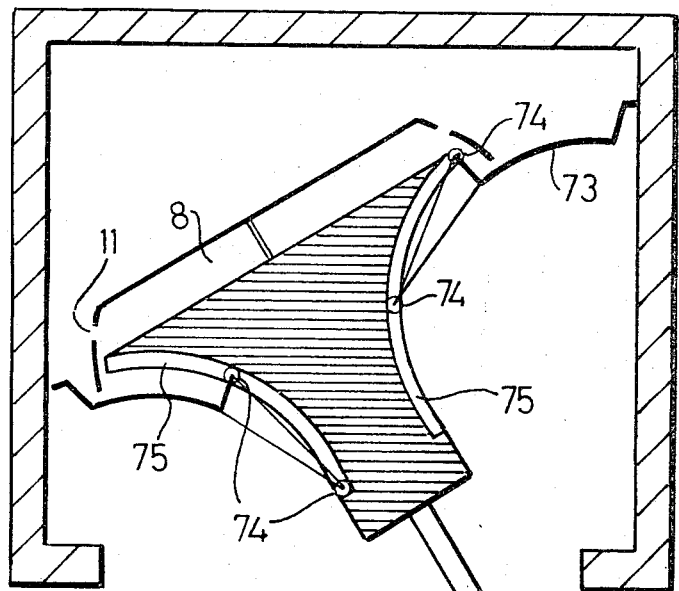
FIG. 18.
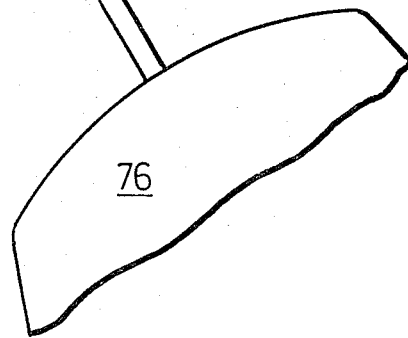
FIG. 19.
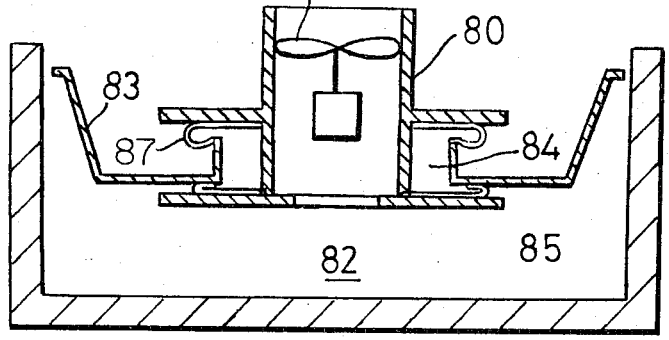

TRACKED AIR CUSHION VEHICLES

This invention relates to air cushion vehicles and more particularly though not exclusively to vehicles for use in the transportation system of my copending Pat. application Ser. No. 140,478 filed May 5, 1971, now U.S. Pat. No. 3,797,398.

That application discloses a transportation system, including an air cushion vehicle and a surface or surfaces upon which said air cushion vehicle may be sustained for movement parallel to said surface or surfaces, the air cushion vehicle comprising at least one air cushion support or guidance means comprising a first wall facing the sustaining surface or one of them, said first wall being located between further flanking walls extending in planes perpendicular to that of the first wall and co-operating with the latter and with said surface or surfaces to define a chamber, said chamber being in communication with means in the vehicle adapted to maintain in the chamber a pressure different from the surrounding atmosphere whereby to apply a supporting or guiding force to said first wall, which wall is connected to or forms part of a load bearing portion of the vehicle, wherein the first wall is moveable relative to the sustaining surface and slideably moveable between and relative to said further walls at least in a direction towards and away from the sustaining surface facing the first wall, said further walls being located by the sustaining surface or surfaces against substantial movement other than movement parallel to said surface or surfaces, and wherein means are provided to control the pressure within the chamber in response to movement of the first wall relative to the sustaining surface which faces it in such a sense as to produce a force acting on said first wall tending to oppose such movement.

In a preferred form of system, the sustaining surfaces are provided by a trough shaped track of inverted channel section, the first wall is an elongated platform from which a load bearing vehicle body is suspended, and the further walls are provided by end plates or bogies extending to the roof and side walls of the track and linked to the end of the support platform, said end plates or bogies being restrained against substantial transverse or vertical movement relative to the track.

In versions of such a system where appreciable curvature in the track is to be accommodated, and/or where the cross section of the track is such that lateral tilting of the platform within the track would result in unwanted variations in the gaps between the platform and the track walls, some form of moveable longitudinal edge member must be provided on the platform to conform to the track curvature and/or to maintain constant gaps between the platform and the track wall. The requirements for such moveable edge members differ from normal air cushion skirts in that they are not intended to and should not apply appreciable guidance forces to the platform, but instead merely serve to control the flow of air between the chamber above the platform of which they form part and the surrounding atmosphere.

Ideally, such a moveable edge member will act to maintain an independently determined pressure differential between the chamber and the atmosphere by controlling the size of a gap between itself and the track wall without applying substantial reactive forces to the platform. A moveable edge member with such properties has applications also in air cushion vehicles wherever an air cushion skirting wall is required which will control the flow of air into or out of the cushion at a desired level without substantial reaction forces being applied to the vehicle as would be the case with a conventional skirt.

An object of the invention is to provide an improved edge member of the type discussed above.

According to the invention, a vehicle includes at least one air cushion support or guidance means comprising wall members having a free edge or edges cooperable with a sustaining surface to define an air cushion chamber, and means for maintaining a pressure within said chamber different from that of the surrounding atmosphere, the free edge or edges of at least one of said walls being formed by an edge member or members moveable in sealing relationship relative to said wall member and each comprising a wall portion adapted to separate air within the chamber from air external to the chamber, the wall portion being configured so that upon the application of a pressure difference by said pressure maintaining means across the wall portion a resultant force acts thereon tending to move it outwards from said wall member, and means to apply an opposing force to said wall portion whereby to balance said resultant force when the pressure difference across the wall portion is of a predetermined magnitude.

The opposing force may be applied by springs but is preferably applied by means of a pressure differential set up across a further wall portion forming part of the edge member, said further wall portion preferably separating from the atmosphere a chamber communicating with a duct through which air is supplied to or exhausted from the chamber.

Where edge members are required to conform to track surfaces of varying curvature, they are preferably formed by a plurality of flexible connected sections.

Figure 2:
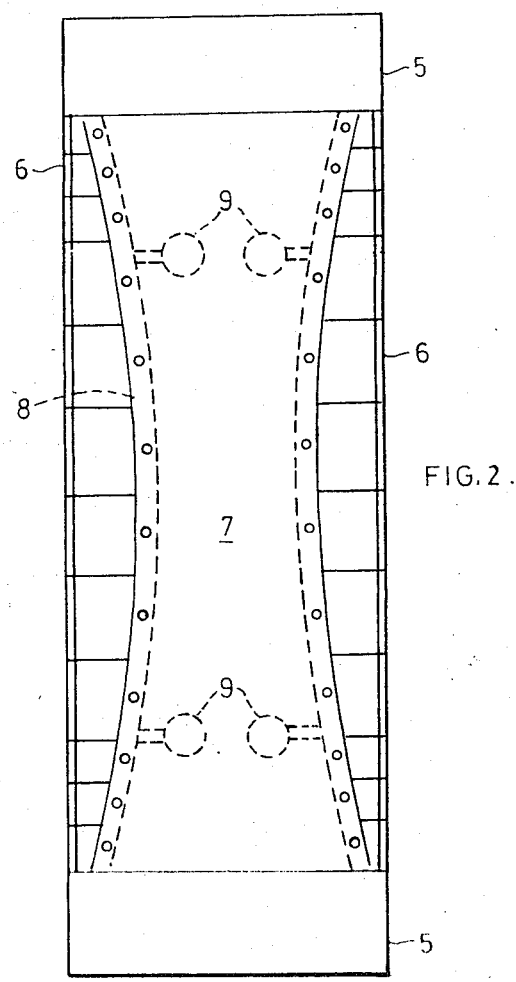
Figure 3:
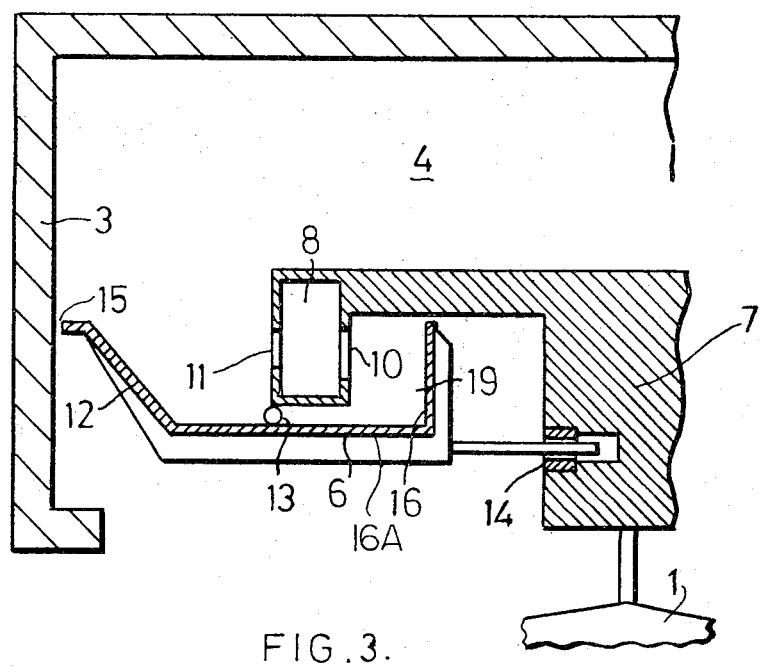
Figure 4:
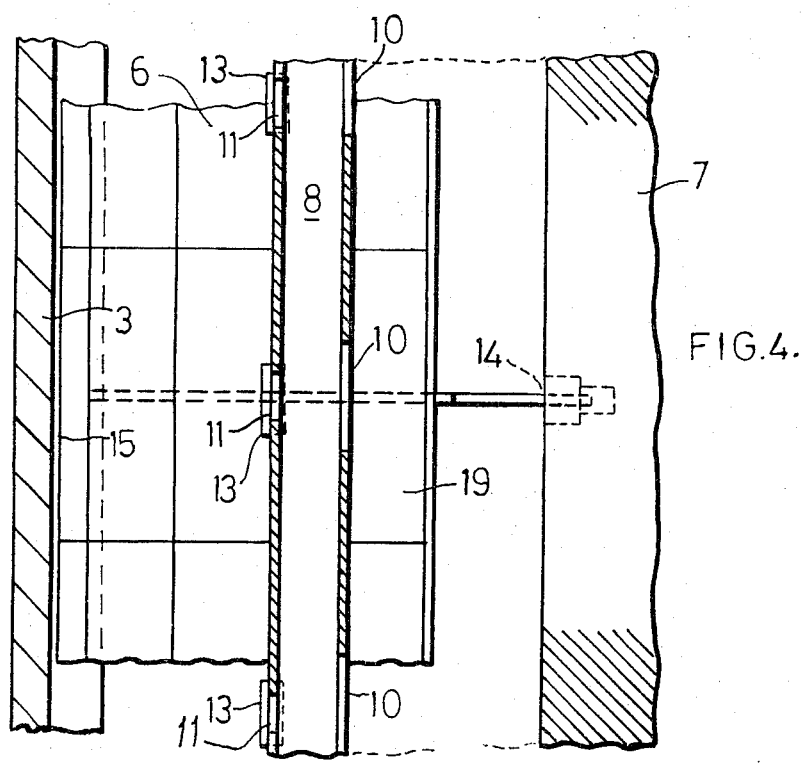
Figure 5:
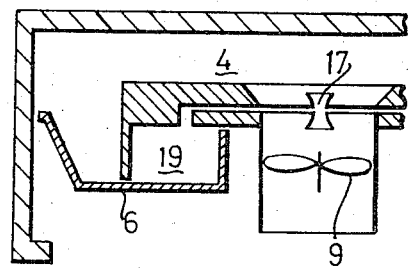
Figure 6:
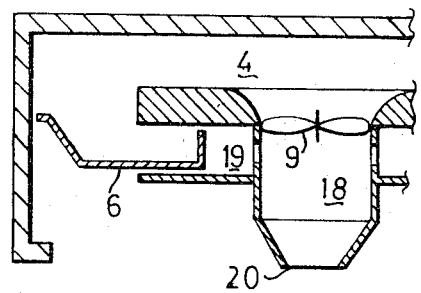
Figure 7:
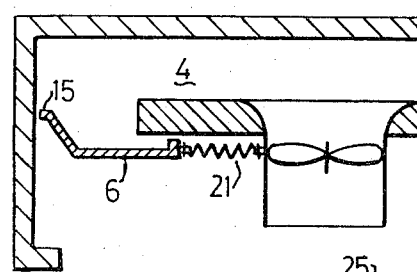
Figure 8A:
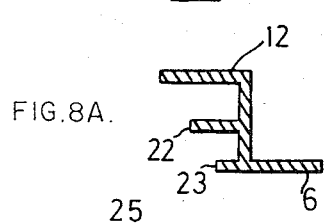
Figure 8B:
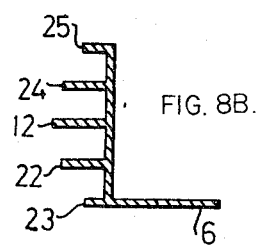
Figure 8C:
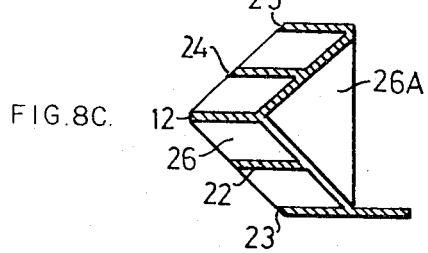
Figure 8D:
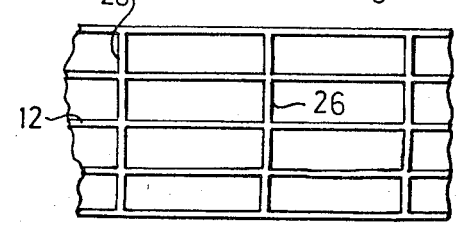
Figure 9:
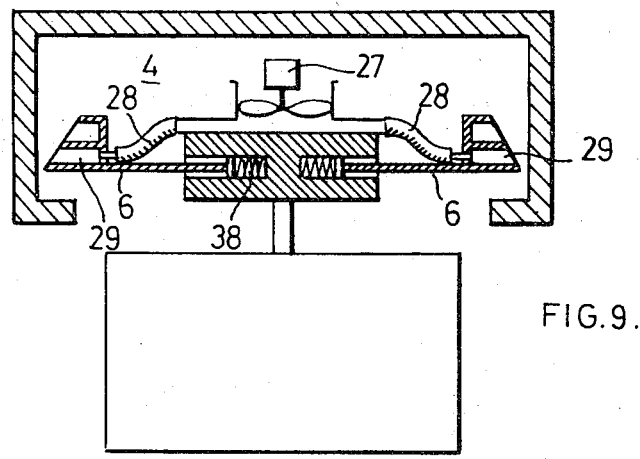
Figure 10:
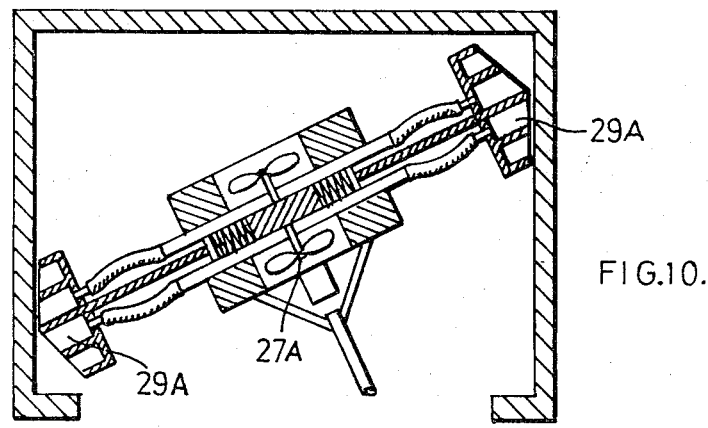
Figure 11:
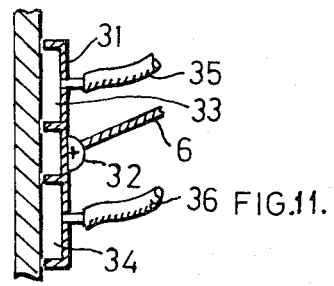
Figure 12:
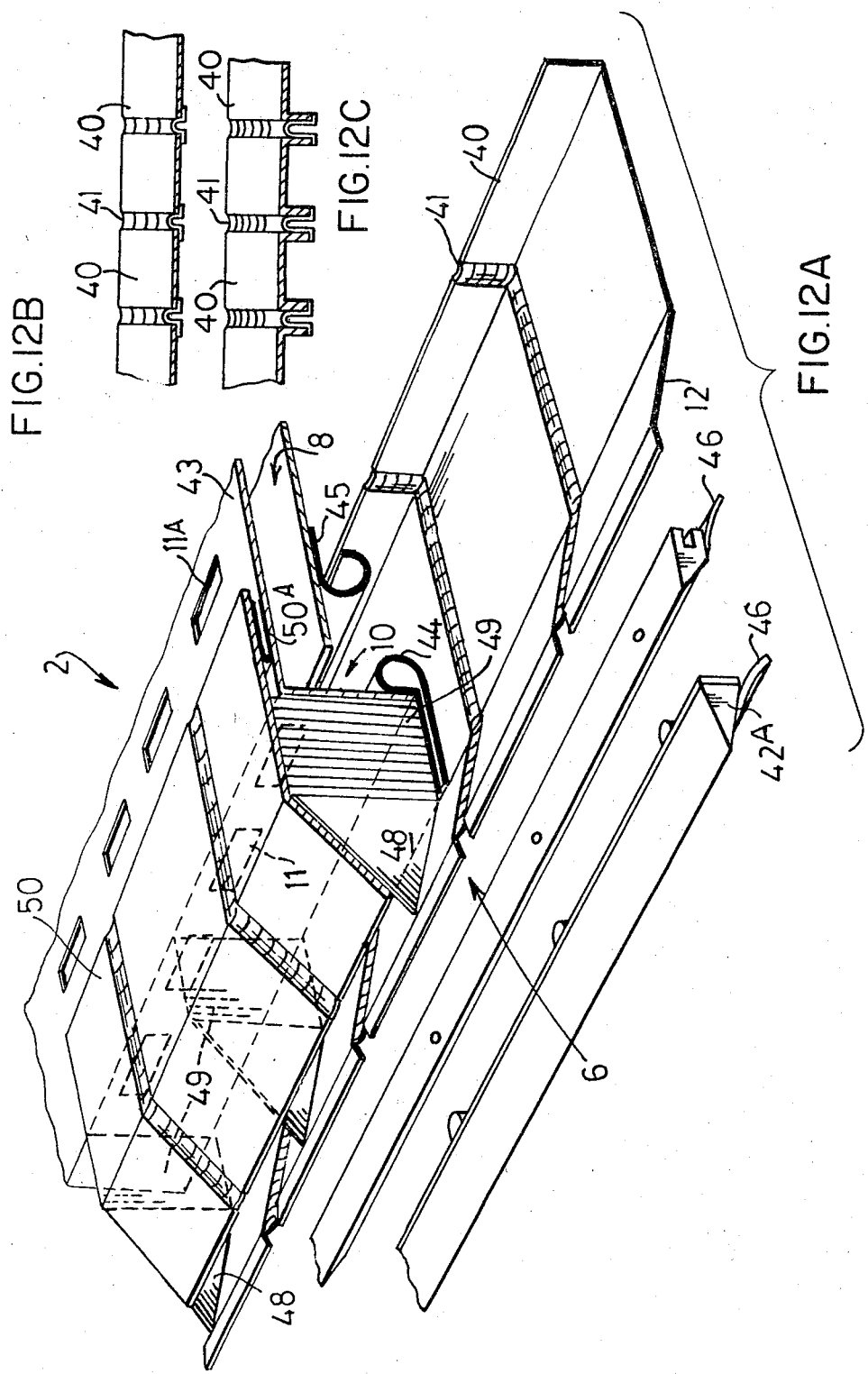
Figure 13:
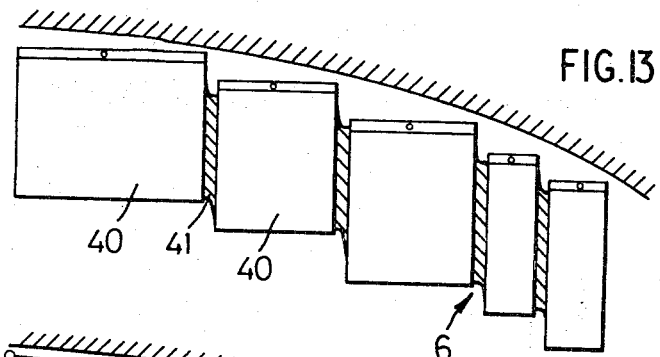
Figure 17A:
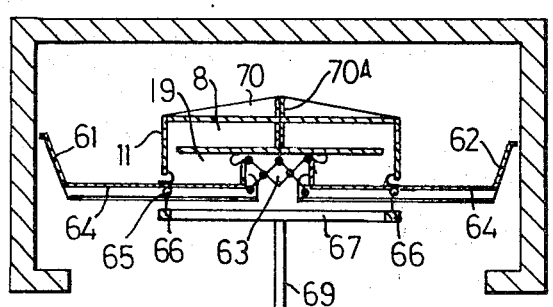
Figure 17B:
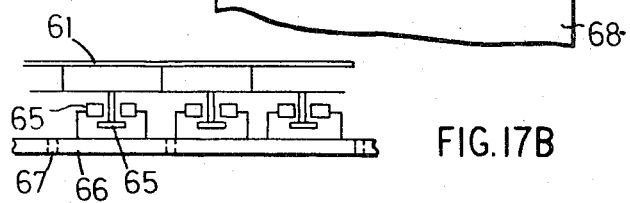
Figure 17C:
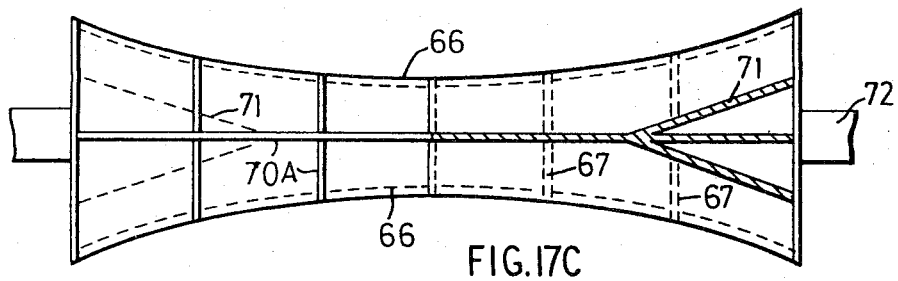
Figure 17D:
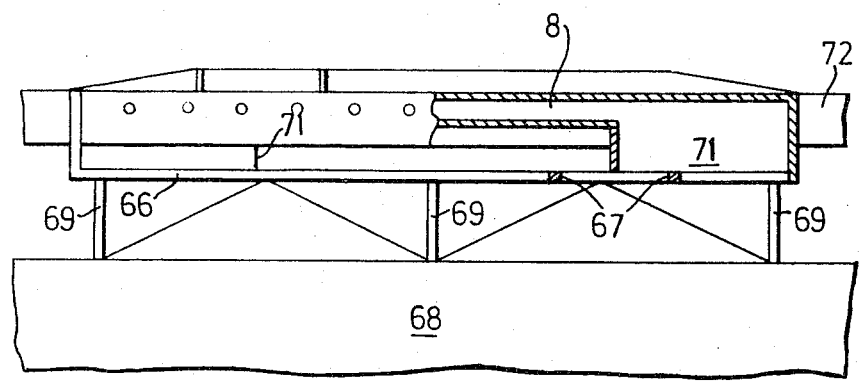

Exemplary embodiments of the invention are described with reference to the accompanying drawings, in which FIG. 1 is a diagrammatic cross-section through the track and a vehicle of a tracked air cushion vehicle system of the type to which the invention is applicable, and FIG. 2 is a plan view of the vehicle, FIGS. 3 and 4 are diagrammatic detail views showing in vertical cross section and plan respectively one embodiment of the invention, FIGS. 5, 6 and 7 are diagrammatic detail view showing variants of the embodiment of FIGS. 3 and 4, FIGS. 8A, B and C show different configurations of edge seal in cross-section, and FIG. 8D shows the seal of FIG. 8C in elevation, FIGS. 9, 10 and 11 are cross-sectional diagrams illustrating the application of different forms of edge seal, FIG. 12A is a perspective partly broken away view of part of a vehicle for use in a system operating on similar principles to those of the embodiment of FIGS. 3 and 4, and FIGS. 12B and 12C are details showing alternative methods of joining adjacent sections of an edge member, FIG. 13 is diagram in plan of one arrangement of adjacent edge member sections, and FIGS. 14A, B and C show an alternative arrangement of sections with the sections conforming to different track surface configurations, FIGS. 15A and B show two different arrangements of seals between an edge member and a lift platform, FIGS. 16A through F show in cross-section and plan a variant of the embodiment of FIG. 12A, FIG. 17A is a cross-sectional diagram of a further embodiment, FIG. 17B being a detail side elevation illustrating aspects of the construction, FIG. 17B being a partly cut away plan view, 17C being a partly cut away side elevation of the same embodiment with the edge members omitted, and 17D is a fragmentary side elevational view with parts broken away and shown in section showing further details of the lift platform and the mounting a carriage thereon.

FIGS. 18 and 19 are cross-sectional diagrams illustrating two further embodiments of the invention.

Referring to the drawings, FIGS. 1 and 2 show a tracked air cushion vehicle system in which a car 1 is supported from a lift platform 2 retained in a track 3 by the maintenance of subatmospheric pressure in a cushion chamber 4 formed between wall members formed by the lift platform, end bogies 5, and the track. The platform 2 consists of a rigid central spine 7 which is connected to the end bogies by connections (not shown) which permit the lift platform to tilt within the track and to rise and fall relative to the end bogies. Such arrangements are described in more detail in my copending Pat. application Ser. No. 140,478, filed May 5, 1971, now U.S. Pat. No. 3,797,398. The central spine 7 is waisted as shown, to allow for track curvature and carries moveable edge seal members 6 which retract or extend from the position shown in FIG. 2 to conform to a curved track wall. The edge seal members 6 consist of a number of flixibly connected separate elements to facilitate the adoption of a curved shape. The central spine 7 comprises hangers 91 supporting the car 1, whilst air distribution ducts 8 along each curved edge of the spine are connected to suction pumps 9 so as to enable the pressure in the chamber 4 to be reduced below atmospheric. FIGS. 3 and 4 show the arrangement of FIGS. 1 and 2 modified in accordance with one embodiment of the invention, the edge seal members 6 having the cross section shown in FIG. 3 and disposed about the ducts 8 so that a chamber 19 is formed inboard of each duct 8 defined by lower and inboard wall portions 16A and 16 respectively, comprising further parts of the associated edge seal member 6. Ports 10 connect the duct 8 to the further chamber 19 and further ports 11 connect the duct 8 to air cushion chamber 4. The outboard edge of edge seal member 6 consists of an inclined or vertical wall portion or barrier 12 having a lip separated from the track 3 by an air gap 15. The edge seal member 6 is allowed to move horizontally by rollers 13, linear bearings 14 or other suitable arrangement such as telescopic struts.

In operation the suction fans 9 set up a subatmospheric pressure $p1$ in the duct 8 resulting in a pressure $p2$ in the chamber 19 and a cushion pressure $pc$ in cushion chamber 4. Thus a closing force is exerted on 6 towards the track wall equal to $(p0-p2) h2$ where $p0$ is atmospheric pressure and $h2$ the vertical height of the inner wall portion 16 of the member 6 as shown in FIG. 3. This force acts regardless of the lateral position of the member 6 and ensures that the seal will move towards the track wall when the fan is switched on; also the force is substantially constant whatever the lateral displacement of the edge member. A second lateral force is exerted on member 6 in the opposite direction by the wall portion 12 adjacent to the track. If the element is in contact with the track so that there is no inflow of air into the chamber 4 this force equals $[po-pc(min)] h1$ where $h1$ is the height of the wall portion 12 and $pc(min)$ is the minimum attainable pressure within the chamber 4. If it is arranged so that $[po-pc(min)] h1$ is greater than $(po-p2) h2$ the edge seal member 6 will move to the right (as shown in FIG. 2) allowing a gap to exist between it and the track wall. In these conditions air will flow into the cushion space and the cushion pressure will rise to a normal working value $pc(norm)$ such that $[po-pc(norm)] h1 = (po-p2) h2$ at equilibrium, thus setting up an air gap 15. The system can be stabilised at a desired air gap 15 by adjusting $h1$, $h2$ and the areas of ports 10 and 11 for a given suction fan characteristic, which last should be selected in relation to the other parameters so that a change in the width of the air gap 15 does result in an opposite change in the magnitude of the cushion pressure under all normal working conditions. The greater the magnitude of this change in pressure, the greater the sensitivity of the system. Movement of the element from this position in either direction results in a restoring force tending to restore the original gap and the system is therefore stable.

An alternative arrangement for providing a depression in the chamber 19 is shown in FIG. 5 in which the suction fan 9 is in direct communication with the cushion space 4 and the pressure $p2$ in the chamber 19 is provided by means of a venturi 17 mounted in the duct connecting the fan to the chamber 4.

A further arrangement is shown in FIG. 6 in which the chamber 19 is formed inboard of the inboard wall portion of the member 6 and is maintained at superatmospheric pressure by means of a connection to a duct 18 downstream of the fan 9, the duct being throttled by a nozzle 20 to provide the required superatmospheric pressure.

FIG. 7 shows an arrangement in which that force on the member 6 tending to move it towards the track is applied by a mechanical spring 21. This simpler arrangement is less versatile in application than the previous methods because the closing force is likely to vary substantially with lateral movement as the spring is compressed or relaxed. Also, for a given spring, the closing force range is fixed, but the opening force depends upon the cushion pressure which in turn depends upon the weight of the vehicle. The latter is likely to vary considerably depending upon whether the vehicle is fully loaded or empty. Thus in service the arrangement of FIG. 7 is likely to result in variations of air gap 15 with vehicle weight and lateral movement of moveable edge seal member 6. By comparison the pressure $p2$ in the previous arrangements is related to $pc$ and a measure of automatic compensation for weight variation is provided.

In all cases extra lip members 22, 23, 24 and 25 as shown in FIGS. 8A-8D may be added to the wall portion 12 to form a labyrinth seal to the cushion chamber at the gap 15. These lips may be below the primary lip of the wall portion 12 as designated 22 and 23 (FIG. 8A) or above as designated 24 and 25 (FIG. 8B). The additional lips must be shorter than the primary lip to allow for changes in angle between edge seal member 6 and the track wall as the lift platform rotates. Vertical walls 26 may also be added to assist in containing local pressure variations along the lips in the longitudinal direction thus facilitating its conforming to a curved track surface. Likewise vertical cross walls 26A provide internal longitudinal compartmentation.

All the above configurations of edge seal rely soley upon pressure differentials across the moveable element 6 to provide an actuating force when it deviates from its equilibrium position. This actuating force can be reinforced or replaced by forcing compressed air between the lip or lips of the wall 12 and the track surface.

In FIG. 9 an auxiliary fan 27 forces air through flexible pipes 28 into the cells 29 formed between the lips of the member 6. This forms an air cushion which holds the edge member a pre-determined distance from the track vertical wall against the force exerted by a closing spring 30 or other means already discussed above. It should be noted that the fan 27 and the cells 29 act as a conventional air cushion support system within the cushion space 4 using air at subatmospheric pressure which is circulating within the cushion space. Any of the configurations shown in FIG. 8 may be used for this method with air being pumped into all or only some of the cells between the lips of the members 6.

Due to the rotation of the lift platform the lips must be cut back as shown in FIGS. 8A–8C and 9 so as to avoid contact with the track wall. At extreme angles of tilt the increase in leakage area from the edge cells 29 on the upgoing side of the platform can be considerable when using the arrangement of FIG. 9, whilst those on the down going side are very effectively sealed with only small cell to track gaps. Improved sealing can be achieved by adding a second set of edge cells 29A as shown in FIG. 10 with a second auxiliary fan 27A feeding air at superatmospheric pressure to these cells 29A. Thus the lateral location of the up-going side is mainly regulated by a positive pressure cushion while downgoing side is mainly regulated by a subatmospheric pressure cushion. In all configurations such as shown in FIGS. 9 and 10 greater effectiveness will be achieved by using separate fans 27 or 27a for each side of the lift platform. Thus in FIG. 10 a total of four fans will provide optimum results although for convenience all fans may be driven by one motor.

To reduce the amount of air which had to be circulated to the cells 29 and 29a in FIGS. 9 and 10 it is desirable to eliminate the need to cut back some of the lips. In FIG. 11 this is achieved by forming edge cells 33 and 34 in a separate member attached to the member 6 by a hinge 32. Air is fed to the cells 33 and 34 from the fans 27, 27a by pipes 35 and 36.

A complete edge seal member 6 consists of a number of segments of one of the cross sections described above, the parts normally being fabricated in metal to withstand the loads imposed upon them. These segments are connected by flexible material allowing sufficient relative movement between each segment for the component as a whole to adapt to curvature of the track wall without air leaks between the segments. The resulting component is mounted on the lift platform so as to allow lateral movement as indicated in FIG. 4 and gaps between it and the main structure are sealed by rolling, sliding or deformable seals to prevent air leakage. Such a segmented edge member conforms to a curved track wall in a number of steps as each segment adjusts to its local conditions: the resulting stepped edge of the lips can be smoothed by providing a further continuous lip of flexible material fixed to each segment lip by a hinged joint or pin. This latter component should be made easily replaceable in service being liable to wear through intermittent contact with the track.

The components of a complete flexible edge seal member 6 operating on the principles shown in FIG. 3 together with adjacent parts of an associated lift platform 2 are shown in FIG. 12A. Metal segments 40 are connected by support means in the form of flexible gusset strips 41 as shown in FIG. 12B and lipped by a flexible strip 42 or 42A to form the edge seal member 6 which is sealed to a body 43 of the lift platform 2 by rolling membranes 44 and 45. Each metal segment 40 is also connected to the main structure by a suitable bearing (not shown) allowing inward and outward movement. The use of rolling membranes 44 and 45 allows an air tight seal between the member 6 and the platform without the need for extreme precision in manufacture and assembly and also allows for distortion of components occurring in use. The material used for the strips 41 and diaphragms 44 and 45 must be sufficiently flexible to allow for the relative movement of the segments 40 (as shown in and described further with reference to FIGS. 13 and 14) and flanges may be added to the segments 40 as shown in FIG. 12C to strengthen the segments and provide additional accomodation for broader gusset strips 41. Sealing strips 46 may be added to the lip members 42 or 42A if required; 42A is a lip of rubber or similar material bonded to a spring steel strip which is mounted to the segments 40 by pins passing through brackets on the strip.

Compartmentation to confine local pressure changes longitudinally of the structure may be provided by vertical walls 48 secured to the segments 40 and connected to the platform body 43 by flexible walls 49. To confine local effects still further a segmented top wall 50, may be supported by the walls 48, the segments being flexibly connected by gusset strips in similar manner to the segments 40, and being connected to the body 43 by a rolling diaphragm 50A. This arrangement is found to reduce interaction between the edge seals on opposite sides of the platform, the relative areas of the orifices 11 opening into the space formed between the platform 2 and the wall portions 12, and the orifices 11A opening directly into the space above the platform 2 being adjusted for minimum interaction.

The top wall 50 encloses the space between the platform 2 and the wall portions 12 except for a gap adjacent the edge of the member 6, and thus largely precludes interaction with the edge member on the other side of the platform.

FIGS. 13 and 14 show two types of relative movement between the segments which allow the member 6 to adopt a curved shape. In FIG. 13 the movement is lateral resulting in a stepped edge as shown. To maintain approximately equal steps the width of the segments at the ends of the member 6 is less than at the centre.

Figure 14A:
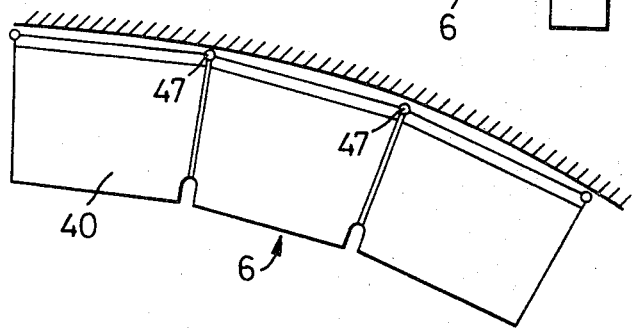
Figure 14B:
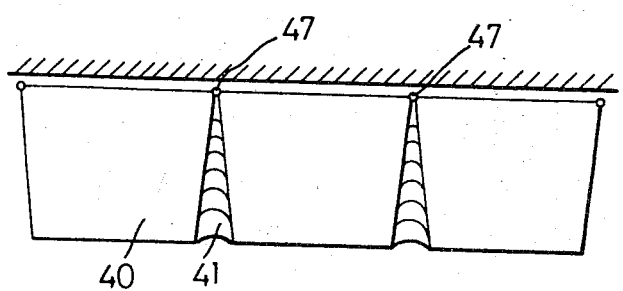
Figure 14C:
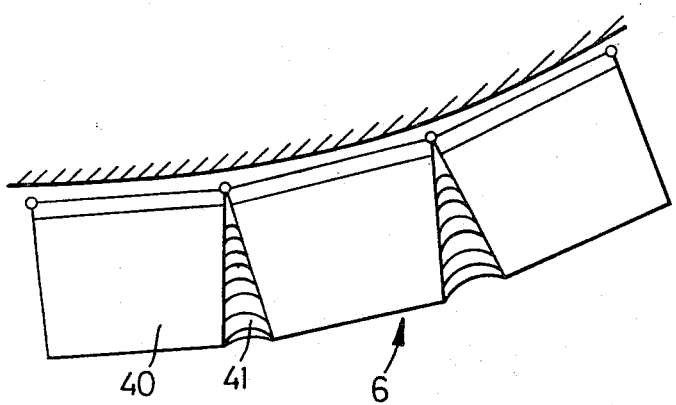

In FIGS. 14A–C the segments are shaped to allow arcuate as well as lateral movement. The flexible gusset strips 41 are triangular, folding when the component conforms to a concave surface as shown in FIG. 14A and opening up when the component conforms to a convex track surface as shown in FIG. 14C. The segments can be secured together at their front edges by hinge pins 47. The member 6 can assume a configuration which approximates to a curve, made up of a series of chords as shown. Arrangements intermediate those shown in FIGS. 13 and 14 may also be employed, allowing a combination of lateral and arcuate movement.

FIGS. 15A and 15B are simplified diagrams illustrating the relative lateral movement of the segments 40 and the platform body 43, and two alternative arrangements for mounting the diaphragms 44 and 45. Similar mounting arrangements may be used for the diaphragm 50A.

FIG. 16 indicates a further method of providing longitudinal compartmentation in the arrangement of FIG. 12A. A longitudinal vertical wall 51 is also carried each segment 40, and the top wall 50, if present, need not be carried inwardly of this wall. The segments 40 and the walls 48, 50 and 51 are all of rigid material and form a triangular box with an opening 53, which is limited by the wall 50 if present, to the cushion space. This box is connected to the duct 8 either by flexible bellows (not shown) or by a sliding or telescopic rigid pipe 55, which latter could form part of the bearing arrangements between the segments 40 and the platform body 43.

FIG. 17 shows diagrammatically one means by which moveable edge members may be incorporated into a lift platform structure so as to allow considerable lateral movement in relation to track width. Two edge members 61 and 62 (shown in FIG. 17A which is a section taken midway along the lift platform, where lateral movement of the edge members is greatest and the space for the lift platform structure most limited) are connected by a lazy tongs or other suitable mechanism 63 extending through an opening in the centre portion of the platform, allowing the members to move apart laterally thus permitting an increase of the width of the platform along its length as the platform tilts within the track whilst retaining the members in mutual alignment. Rails 64 beneath each member serve as structural stiffeners and guide the members by engagement with rollers 65 carried by a frame structure consisting of two curved longitudinal beams 66 connected along their length by cross members 67 (see FIG. 17B). A coach 68 is supported from this frame by hangers 69 (see also FIG. 17D), or alternatively the frame may form an integral part of the coach roof. A top structure 70 completing the lift platform, and reinforced by ribs 70A, is supported above this frame structure by triangular structures 71 at the ends of the platform where the movement of the edge members is less and space is available. Fans may be located within the structures 71, connected to ducts 8 and hence to the space above the lift platform and to chambers 9, operating as described with reference to previous embodiments. Extensions 72 on the axis of rotation of the lift platform enter end bogies (not shown). This form of construction allows the individual edge members to move through the opening (see FIG. 17D) between the structures 71 and thus beyond the centre line of the platform along the center portion its length when negotiating extreme track curvature.

An embodiment is shown in FIG. 18 which operates on similar principles to that of FIG. 3, but edge seal members 73 are provided which are of arcuate cross section and are constrained to follow arcuate paths by rollers 74 running in guides 75. This arrangement has the advantage that the change of angle between the lips of the seal edge members 73 and the vertical wall of the track is reduced for any given degree of tilt of the lift platform. It has the disadvantage that the effective angle of tilt so far as the generation of forces opposing tilt of the platform is concerned is less than the geometric angle of tilt of the lift platform.

The above embodiments have all related to the provision of longitudinal edge members for a lift platform supporting a coach. However, the same techniques can also be applied to members designed to divide an air cushion into sections extending along its longitudinal or transverse axis, so as to give increased stability margins about those axes, or in providing edge seals for any part of the suspension system. An important example of the latter are edge seals for those walls of independently guided end bogies, utilised in various embodiments of the tracked air cushion vehicle system described in my co-pending Pat. application Ser. No. 140,478 which close the ends of the space above a lift platform supporting a coach.

The invention is also applicable to tracked air cushion vehicle systems utilising super-atmospheric air cushions. In FIG. 19, a vehicle 80 is supported from a track 85 by a super-atmospheric air cushion 82 generated by a fan 86. The longitudinal edges of the vehicle are provided with edge members 83 (corresponding to the members 6 in FIG. 3) and a force tending to close the gaps between the members 83 and the track 85 is provided by a superatmospheric pressure p2 in chamber 84 (corresponding to chamber 19 in FIG. 3). The members 83 are sealed to the vehicle structure by rolling diaphragms 87 corresponding to the diaphragms 44 and 45 in FIG. 12.

I claim:

1. In a tracked air cushion vehicle assembly comprising a lift platform movable longitudinally of a channel section track with which it cooperates to define a chamber, said track channel having side walls, means for maintaining within said chamber an air cushion sustaining the weight of the vehicle, the lift platform supporting along opposite sides thereof edge seal members extending in the general plane of the lift platform towards the side walls of the track channel, and said edge seal members being capable of conforming to the profile of said side walls, the improvement wherein at least part of each edge seal member forms a barrier between the chamber and the external atmosphere, which barrier lies at an angle to the general plane of the platform whereby a resultant pressure force acts on each barrier tending to move the edge seal members towards each other, and wherein means are provided for applying an opposing force to said edge seal members whereby to balance said resultant forces when the pressure difference across each barrier is of predetermined magnitude.

2. A vehicle according to claim 1 wherein the means for applying the opposing force comprises spring means acting between the edge seal member and the platform.

3. A vehicle according to claim 1 wherein the means for applying the opposing force comprises a further part of the edge seal member, and means for applying a predetermined pressure difference across this further part.

4. A vehicle according to claim 3, wherein the means for maintaining the air cushion comprises an air pump within a duct system on the vehicle, and the means for applying a pressure difference across said further part of said edge seal member defines a chamber of which said further part of said edge seal member forms one wall and which is in communication with said duct.

5. A vehicle according to claim 3 wherein bearing means support the edge seal members for linear movement relative to the platform.

6. A vehicle according to claim 3 wherein support means support the edge seal members for arcuate movement relative to the platform.

7. A vehicle according to claim 1 wherein the edge seal member is formed in a plurality of flexibly connected sections.

8. A vehicle according to claim 7 wherein the sections are connected by flexible gusset strips.

9. A vehicle according to claim 7 wherein the edge seal member is provided with a flexible longitudinally extending lip.

10. A vehicle according to claim 1 wherein the barrier partially encloses a space between said barrier and a first wall inboard of said barrier, the means for maintaining the air cushion within the chamber comprising a distribution duct within the platform, and there are means placing said duct in communication with said space.

11. A vehicle according to claim 10 wherein cross walls extending between said barrier and said first wall longitudinally compartmentise the space.

12. A vehicle according to claim 11 wherein a further wall encloses the space except for an opening into the chamber just inboard of an outer edge of the edge seal member, the further wall being supported by the edge seal member and extending from the first wall towards said outer edge.

13. A vehicle according to claim 12 wherein the distribution duct is also in direct communication with the chamber.

14. A vehicle according to claim 10 wherein said further wall forms part of the main portion of the platform.

15. A vehicle according to claim 10 wherein said further wall forms part of the edge seal member.

16. A vehicle according to claim 1 wherein the edge seal members are provided at outer edges thereof with a plurality of parallel longitudinally extending lips defining channels therebetween.

17. A vehicle according to claim 16 wherein the lips are arranged in echelon.

18. A vehicle according to claim 16 wherein the lips are formed on a carrier hingedly connected to the remainder of the edge member.

19. A vehicle according to claim 16 wherein the channels are divided into sections by transverse ribs.

20. A vehicle according to claim 16 wherein at least some of the channels are connected by ducts to a source of pressurised air.

21. A vehicle according to claim 1, in which the edge seal members are anchored to the lift platform at their ends.

22. A vehicle according to claim 21, wherein portions of the edge seal members are linked by means extending through an opening defined in the lift platform, into which opening either one of the edge members is movable beyond the longitudinal centre line of the lift platform.

23. In an air cushion vehicle system having air cushion means comprising fixed and movable wall members co-operating with one another and one of said wall members presenting free edges cooperating with sustaining surfaces of the other of said wall members to define an air cushion chamber between said fixed and movable wall members, and air pump means within a duct on the vehicle in communication with the chamber and with the surrounding atmosphere for maintaining the atmosphere within the chamber at a pressure different from that of the surrounding atmosphere, the improvement wherein at least one of said free edges if formed by an edge member, means mounting said edge member for movement in sealed relationship to said one wall member over a path of movement substantially in the general plane of said one wall member, a substantial part of said edge member forming a barrier between the chamber and the surrounding atmosphere, which barrier lies at an angle to the general plane of the one wall member whereby a pressure maintained by said pump within the chamber causes a resultant pressure force to act on said barrier tending to move said edge member inwardly towards the remainder of said one wall member, a further part of said edge member lying at an angle to the general plane of said one wall member and cooperating with the remainder of said one wall member to separate from the surrounding atmosphere a space in communication with said air pump duct with a resultant pressure force being caused to act on said further part of the edge member in such a sense as to oppose the resultant pressure force acting on the barrier.

* * * * *